United States Patent Office 3,070,518
Patented Dec. 25, 1962

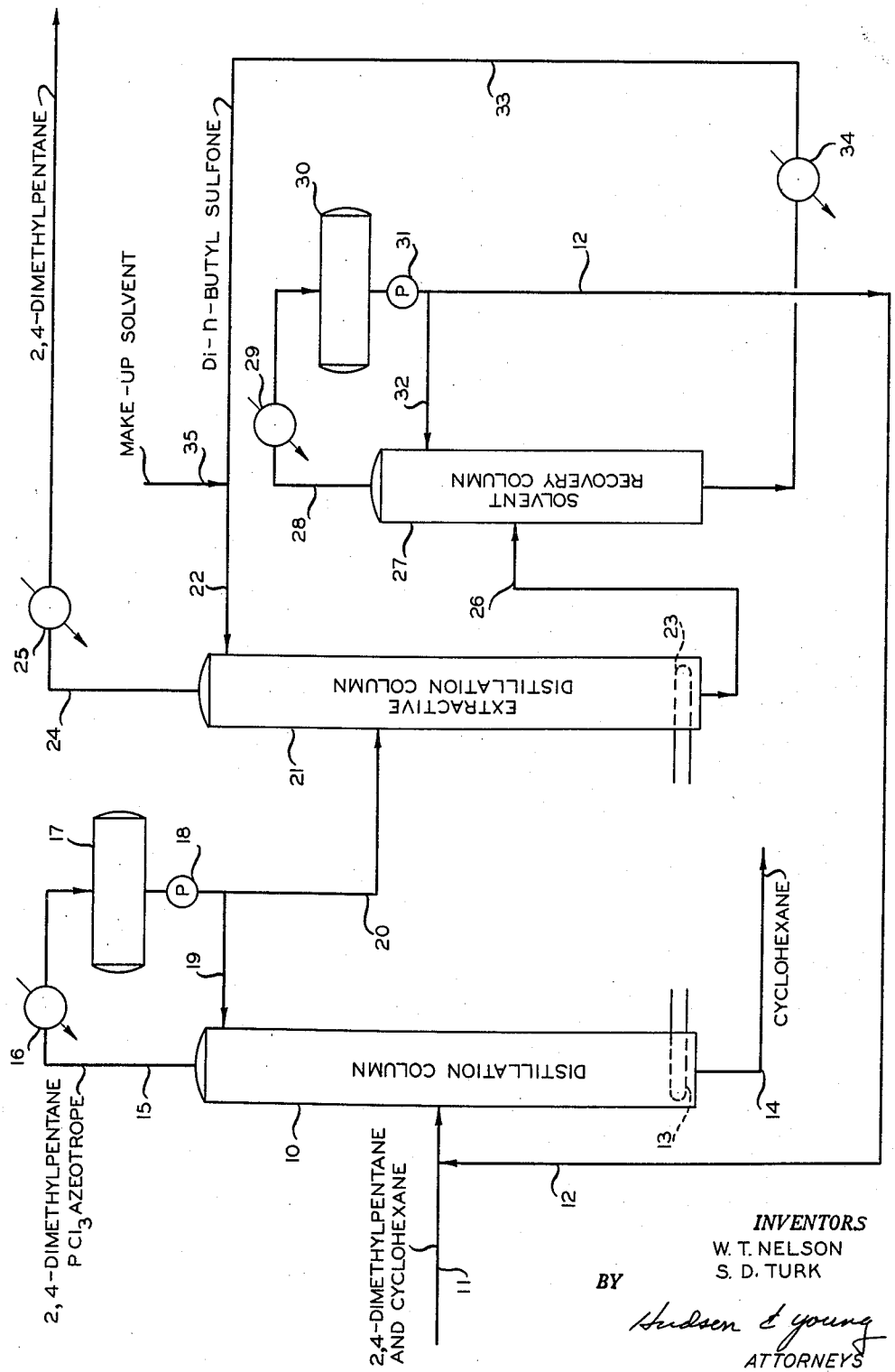

3,070,518
EXTRACTIVE DISTILLATION OF PHOSPHORUS HALIDE-HYDROCARBON MIXTURES
William T. Nelson and Stanley D. Turk, Bartlesville, Okla., assignors to Phillips Petroleum Company, a corporation of Delaware
Filed Aug. 22, 1960, Ser. No. 50,958
12 Claims. (Cl. 202—39.5)

This invention relates to the separation of phosphorus halides from hydrocarbons. In accordance with one aspect, this invention relates to the resolution of phosphorus trihalide-hydrocarbon azeotropes by extractive distillation. In accordance with another aspect, this invention relates to the separation of phosphorus trihalides from azetotropes of said trihalides with $C_7$ alkanes, such as 2,4-dimethylpentane, 2,2-dimethylpentane and 2,2,3-trimethylbutane.

The processes of azeotropic distillation and extractive distillation for separating a hydrocarbon component from another hydrocarbon component of substantially the same boiling point contained in a complex hydrocarbon mixture are well known. In these processes, the hydrocarbon mixture is fractionally distilled in the presence of an added substance (entrainer or solvent) which alters the relative volatilities of the hydrocarbon to such an extent that fractional distillation is feasible. The phosphorus trihalides have been found to be excellent entrainers for the separation of some close-boiling hydrocarbons. For example, when a mixture of cyclohexane and 2,4-dimethylpentane is fractionally distilled in the presence of a sufficient amount of phosphorus trichloride, the phosphorus trichloride has been found to azeotrope with only the 2,4-dimethylpentane. In such an azeotropic distillation process, substantially pure cyclohexane is recovered as bottoms product and a mixture of phosphorus trichloride and 2,4-dimethylpentane distills overhead. A more detailed description of this specific process and azeotropic distillation in general is set forth in U.S. 2,786,804 to William T. Nelson. This patent discloses and claims the separation of close-boiling paraffinic and naphthenic hydrocarbons by distillation in the presence of phosphorus halides.

One of the difficulties encountered in distillation processes wherein an added substance or entrainer is employed lies in the separation or recovery of the added substance from the hydrocarbon fraction with which it associates itself. Ordinarily, separation or recovery of the added substance or entrainer is effected by phase separation, solvent extraction, azeotropic distillation or extractive distillation processes. The separation of phosphorus trihalides from hydrocarbons by extractive distillation is somewhat difficult and can be expensive because of the reactivity of the phosphorus trihalides with many potential solvents. Thus, for example, water cannot be used in the separation since it readily reacts with the phosphorus trihalides.

Accordingly, an object of this invention is to provide a selective solvent and an extractive distillation process employing said solvent for the resolution of a phosphorus halide-hydrocarbon mixture.

Another object of this invention is to provide an improved extractive distillation process for the separation of phosphorus trihalides from azeotropic mixtures containing said trihalides and hydrocarbons.

A further object of this invention is to provide an improved extractive distillation process for the separation of phosphorus trihalides from azeotropes of said trihalides and $C_7$ alkanes.

Still another object of this invention is to provide an improved process for the resolution of the azeotrope phosphorus trichloride-2,4-dimethylpentane by extractive distillation.

Other objects, aspects, as well as the several advantages of the invention, will be apparent to those skilled in the art upon reading this disclosure, the attached drawing and the appended claims.

According to the present invention, phosphorus halide-hydrocarbon mixtures, which cannot be readily separated by ordinary distillation, are effectively separated by extractive distillation in the presence of a solvent comprising at least one dialkyl sulfone. We have found that dialkyl sulfones are effective selective solvents for the separation of phosphorus halides from mixtures of hydrocarbons and said phosphorus halides.

More specifically, according to the invention, a dialkyl sulfone is employed as a selective solvent in an extractive distillation process to selectively separate a phosphorus halide from a mixture of a phosphorus halide and at least one of a paraffinic, a naphthenic and an aromatic hydrocarbon.

In accordance with one specific aspect of the invention, a mixture of 2,4-dimethylpentane and cyclohexane is fractionally distilled in the presence of phosphorus trichloride, as an entrainer, to form an azeotrope of 2,4-dimethylpentane and said trichloride. The resulting 2,4-dimethylpentane-phosphorus trichloride azeotrope is contacted in an extractive distillation column countercurrently with di-n-butyl sulfone whereby the azeotrope is broken. Substantially pure 2,4-dimethylpentane is recovered overhead as product from the extractive distillation step, and the resulting mixture of sulfone and trihalide removed as bottoms is fractionated to recover each of these components, which are then separately recycled to the appropriate distillation columns.

The method of this invention finds application generally in the separation of azeotropes of hydrocarbons and phosphorus trihalides. Examples of specific hydrocarbon azeotropes which can be readily resolved include benzene-phosphorus trichloride, 2,4-dimethylpentane-phosphorus trichloride, n-hexane-phosphorus trichloride, 2,2-dimethylpentane-phosphorus trichloride, and the like.

As previously mentioned, the azeotropes which are treated in the method of this invention are obtained as a result of the use of phosphorus trihalide in the resolution of close-boiling hydrocarbon mixtures. The halides which form azeotropes include particularly phosphorus trichloride, phosphorus tribromide, and phosphorus trifluoride. Phosphorus trifluoride and phosphorus pentafluoride are not ordinarily used in the separation of hydrocarbon mixtures because of their low boiling points. Phosphorus dichloride is very unstable and does not usually form azeotropes.

The sulfones which are employed in carrying out the invention have the characteristic structural formula

wherein both R's are alkyl radicals and the total number of carbon atoms per sulfone molecule ranges from 2 to 12, inclusive. Although sulfones containing more than 12 carbon atoms can be used in the invention, these are not preferred since they tend to show lower selectivity than those of less than 12 carbon atoms. Also, the alkyl radicals can be the same or different. Also, according to the invention, mixtures of two or more sulfones can be used as the solvent for extractive distillation. Specific examples of suitable sulfones according to the invention include dimethyl sulfone, methyl ethyl sulfone, diethyl sulfone, di-n-propyl sulfone, di-i-propyl sulfone, di-n-butyl sulfone, di-sec-butyl sulfone, di-tert-butyl sulfone, di-n-pentyl sulfone, ethyl-n-propyl sulfone, ethyl-i-propyl sulfone, n-propyl n-butyl sulfone and di-n-hexyl sulfone, and the like.

In carrying out the invention, the hydrocarbon-phosphorus trihalide azeotrope is contacted with a sulfone under suitable extractive distillation conditions whereby the azeotrope is broken. More usually, it is preferred to carry out the contacting step under countercurrent flow conditions in a conventional distillation tower, which can contain bubble cap trays, perforated trays, baffles, packing or other suitable type of contacting arrangement. The extractive distillation process can be performed as a batch process; however, it is usually carried out as a continuous process with the sulfone being introduced in the upper portion of the extractive distillation column and flowing downwardly countercurrent to the azeotrope feed.

The extractive distillation step of the invention can be carried out over a wide range of temperatures, namely, at temperatures between about 100 and 300° F., and at pressures between about 5 and about 100 p.s.i.a., preferably about atmospheric. The sulfones are of relatively high melting point, for example, 228° F. for dimethyl sulfone and 110° F. for di-n-butyl sulfone. Some, however, such as ethyl-isoamyl sulfone have melting points as low as 56° F. Thus it is advisable to choose distillation conditions such that the solvent will be liquid at the minimum temperature prevailing in the system. As indicated above, distillation pressures employed are preferably at least atmospheric, though higher pressures are quite satisfactory.

The amounts of sulfone employed in the process will vary depending on the specific sulfone employed and on the particular azeotrope being treated. Usually, it is desirable to provide in the extractive distillation column a sufficient quantity of sulfone to provide a sulfone-to-azeotrope volume ratio of between about 0.5:1 and about 20:1, and preferably between about 1:1 and about 5:1. Ordinarily a larger volume of solvent of relatively higher molecular weight is required to give results equivalent to a solvent of relatively lower molecular weight.

The hydrocarbon component of the azeotrope, subjected to extractive distillation in accordance with the invention, is usually removed overhead from the extractive distillation column and a mixture of sulfone and phosphorus trihalide is removed from the lower portion of the column. This mixture of sulfone and trihalide can be treated by distillation or other suitable separation to separate the sulfone and trihalide, which can then be reused in the process.

In order to more clearly describe the invention and provide a better understanding thereof, reference is had to the accompanying drawing which is a diagrammatic illustration of a unit for separating hydrocarbons utilizing a phosphorus trihalide as azeotroping agent, with further resolution of the resulting trihalide-hydrocarbon azeotrope in accordance with the method of this invention.

Referring now to the drawing, a mixture of 2,4-dimethylpentane and cyclohexane in conduit 11 is combined with phosphorus trichloride in conduit 12, the combined stream being introduced into distillation column 10 as feed. In this column, which can be a conventional bubble tray fractionating column, heat is introduced to the feed mixture to be distilled from reboiler 13 and the feed is separated into a cyclohexane product stream recovered in conduit 14 and an azeotrope taken overhead through conduit 15. The azeotrope taken overhead in conduit 15 is condensed in condenser 16 and then passed to accumulator 17 from which it is withdrawn through pump 18, a portion being returned to the distillation column through conduit 19, as reflux, and the remainder being introduced through conduit 20 to extractive distillation column 21.

In extractive distillation column 21, which can also be a conventional bubble tray fractionating column, the azeotrope is contacted with di-n-butyl sulfone introduced in the upper portion of column 21 through conduit 22. Through the combined action of the sulfone solvent and heat introduced into the bottom of column 21 through reboiler 23, the azeotrope is broken and a stream of substantially pure 2,4-dimethylpentane passes overhead from the column through conduit 24. The overhead vapors are condensed in condenser 25 and removed from the unit as product, and sent elsewhere for further processing, if desired. The tower bottoms which comprises a mixture of di-n-butyl sulfone and phosphorus trichloride are removed through conduit 26 and introduced into solvent recovery column 27.

In solvent recovery column 27, the two components of the bottoms mixture are separated by fractional distillation or other suitable separation, with the phosphorus trichloride passing overhead as a vapor through conduit 28. This overhead material is condensed in condenser 29 and introduced into accumulator 30. A portion of the accumulator contents are returned to column 27 as reflux through pump 31 and conduit 32, and the remainder is combined with the feed to distillation column 10 through conduit 12, as previously described. Di-n-butyl sulfone, which is removed from the bottom of solvent recovery column 27 is passed through conduit 33, cooler 34 and then returned to the top of extractive distillation column 22 by way of conduit 21. Make-up solvent can be added to conduit 22 through conduit 35 as needed.

The preceding discussion has been directed to a specific embodiment of the invention. However, this is not to be taken in any limiting sense and it is within the scope of the invention to use other apparatus and processing arrangements for effecting contact between the sulfone and azeotrope to provide resolution of said azeotrope.

A better understanding of our invention will be obtained upon reference to the following illustrative example which is not intended however to be unduly limitative of the invention.

*Example*

A 134.1 gram portion of an azeotropic mixture of $PCl_3$ and 2,4-dimethylpentane which was 75 liquid volume percent $PCl_3$ and 51.9 grams of di-n-butyl sulfone were distilled under total reflux at 170° F. and 743 mm. Hg pressure. The distillate analyzed 67.8 liquid volume percent $PCl_3$.

The separation factor calculated from these data is 1.42.

The separation factor of 1.42 shows that di-n-butyl sulfone is very effective in breaking the azeotrope. The above data represent the equilibrium obtained in one contacting stage. It will be realized by those skilled in the art that an increase in the number of contacting stages will result in an increase in the concentration of phosphorus trichloride in the bottoms product and an increase in the concentration of 2,4-dimethylpentane in the overhead product.

As will be evident to those skilled in the art, various modifications of the invention can be made, or followed, in the light of the above disclosure and the appended claims, without departing from the spirit or scope of said disclosure in said claims.

We claim:

1. A process for the resolution of an azeotrope of a phosphorus trihalide selected from the group consisting of phosphorus trichloride, phosphorus tribromide and phosphorus trifluoride and a hydrocarbon selected from the group consisting of aliphatic hydrocarbons containing 6 and 7 carbon atoms and benzene which comprises subjecting said azeotrope to extractive distillation in the presence of at least one dialkyl sulfone.

2. A process according to claim 1 wherein said sulfone has from 2 to 12 total carbon atoms per molecule.

3. A process according to claim 2 wherein said sulfone is di-n-butyl sulfone.

4. A process according to claim 3 wherein said hydrocarbon is 2,4-dimethylpentane and said trihalide is phosphorus trichloride.

5. A process for the resolution of an azeotrope of a phosphorus trihalide selected from the group consisting of phosphorus trichloride, phosphorus tribromide and phosphorus trifluoride and at least one $C_7$ alkane which comprises subjecting said azeotrope to extractive distillation in the presence of a dialkyl sulfone having from 2 to 12 total carbon atoms per molecule.

6. A process according to claim 5 wherein said sulfone is di-n-butyl sulfone.

7. A process for the resolution of an azeotrope of phosphorus trichloride and 2,4-dimethylpentane which comprises subjecting said azeotrope to extractive distillation in the presence of a dialkyl sulfone having from 2 to 12 total carbon atoms per molecule.

8. A process according to claim 7 in which the extractive distillation is carried out in a temperature range between about 100 and about 300° F.

9. A process for the resolution of an azeotrope of phosphorus trichloride and 2,4-dimethylpentane which comprises subjecting said azeotrope to extractive distillation in the presence of di-n-butyl sulfone at a temperature in the range between about 100 and about 300° F.

10. A process for the resolution of an azeotrope of phosphorus trihalide selected from the group consisting of phosphorus trichloride, phosphorus tribromide and phosphorus trifluoride and a hydrocarbon selected from the group consisting of $C_6$ and $C_7$ aliphatic hydrocarbons and benzene which comprises contacting said azeotrope in an extractive distillation zone with a dialkyl sulfone having from 2 to 12 total carbon atoms per molecule, as a solvent, under azeotrope breaking conditions of temperature and pressure, removing a mixture of said sulfone and said trihalide from said zone and separating same, and recovering said hydrocarbon from said extractive distillation zone substantially freed of said trihalide as product of the process.

11. The process of claim 9 in which the extractive distillation step is carried out at a temperature between 100 and about 300° F. employing a volume ratio of sulfone to trihalide ranging from about 0.5:1 to about 20:1.

12. A process for the resolution of an azeotrope of phosphorus trichloride and a dimethylpentane which comprises contacting said azeotrope in an extractive distillation zone with di-n-butyl sulfone, as a solvent, at a temperature between 100 and about 300° F. employing a volume ratio of sulfone to trichloride ranging from about 0.5:1 to about 20:1, removing a mixture of said sulfone and said trichloride from said zone and separating same, and recovering dimethylpentane as product from said zone substantially freed of said trichloride.

References Cited in the file of this patent

UNITED STATES PATENTS

| | | |
|---|---|---|
| 2,357,028 | Shiras et al. | Aug. 29, 1944 |
| 2,801,957 | Ray | Aug. 6, 1957 |
| 2,849,514 | Nevitt | Aug. 26, 1958 |
| 2,922,753 | Nelson | Jan. 26, 1960 |